(12) United States Patent
Gettemy et al.

(10) Patent No.: US 7,324,093 B1
(45) Date of Patent: Jan. 29, 2008

(54) FLEXIBLE SCREEN DISPLAY WITH TOUCH SENSOR IN A PORTABLE COMPUTER

(75) Inventors: Shawn Gettemy, San Jose, CA (US); Francis James Canova, Jr., Fremont, CA (US)

(73) Assignee: Palm, Inc., Sunnyvale, CA (US)

( * ) Notice: Subject to any disclaimer, the term of this patent is extended or adjusted under 35 U.S.C. 154(b) by 118 days.

(21) Appl. No.: 09/773,136

(22) Filed: Jan. 30, 2001

Related U.S. Application Data

(63) Continuation-in-part of application No. 09/728,023, filed on Nov. 30, 2000.

(51) Int. Cl.
*G09G 5/00* (2006.01)

(52) U.S. Cl. .................. 345/173; 345/87; 345/156; 345/157; 345/174; 345/178; 178/18.01; 178/18.03; 178/18.05

(58) Field of Classification Search ........ 345/173–174, 345/1, 3, 87, 700, 704, 156–157, 178; 178/18.01, 178/18.03, 18.05, 1
See application file for complete search history.

(56) References Cited

U.S. PATENT DOCUMENTS

| | | | |
|---|---|---|---|
| 4,429,478 A | 2/1984 | Bruce-Sanders | |
| 5,634,080 A * | 5/1997 | Kikinis et al. | 710/73 |
| 5,696,982 A | 12/1997 | Tanigawa et al. | |
| 5,907,375 A * | 5/1999 | Nishikawa et al. | 349/12 |
| 5,949,643 A | 9/1999 | Batio | |
| 5,955,198 A * | 9/1999 | Hashimoto et al. | 428/414 |
| 6,017,584 A | 1/2000 | Albert et al. | |
| 6,057,814 A | 5/2000 | Kalt | |
| 6,067,074 A * | 5/2000 | Lueders | 345/156 |
| 6,069,593 A | 5/2000 | Lebby et al. | |
| 6,118,426 A | 9/2000 | Albert et al. | |
| 6,144,358 A | 11/2000 | Narayanaswamy et al. | |
| 6,210,771 B1 * | 4/2001 | Post et al. | 428/100 |
| 6,229,502 B1 | 5/2001 | Schwab | |
| 6,252,564 B1 | 6/2001 | Albert et al. | |
| 6,256,009 B1 * | 7/2001 | Lui et al. | 345/684 |
| 6,297,945 B1 | 10/2001 | Yamamoto | |
| 6,304,763 B1 | 10/2001 | Jahagirdar et al. | |
| 6,311,076 B1 * | 10/2001 | Peuhu et al. | 455/566 |
| 6,326,613 B1 | 12/2001 | Heslin et al. | |
| 6,327,482 B1 | 12/2001 | Miyashita | |
| 6,333,736 B1 * | 12/2001 | Sandbach | 345/178 |
| 6,340,957 B1 | 1/2002 | Adler et al. | |
| 6,343,006 B1 | 1/2002 | Moscovitch et al. | |
| 6,367,934 B1 | 4/2002 | Salesky et al. | |

(Continued)

FOREIGN PATENT DOCUMENTS

EP 898223 A2 2/1999

(Continued)

*Primary Examiner*—Richard Hjerpe
*Assistant Examiner*—Leonid Shapiro

(57) ABSTRACT

A user interface for a portable electronic device comprising a flexible display panel and a flexible touch sensor. The flexible touch sensor is operable to register a position where contact is made with a surface of the flexible display panel, such that the position of contact registered is translated into a particular command for controlling the portable electronic device. In the present embodiment, the flexible touch sensor is disposed beneath the flexible display panel. As such, the quality of the display is not diminished. In addition, the combination of the flexible display panel and the flexible touch sensor reduces the thickness of the portable computer system.

13 Claims, 20 Drawing Sheets

U.S. PATENT DOCUMENTS

| | | |
|---|---|---|
| 6,377,228 B1 * | 4/2002 | Jenkin et al. .............. 345/1.3 |
| 6,377,324 B1 * | 4/2002 | Katsura ..................... 349/58 |
| 6,392,786 B1 | 5/2002 | Albert |
| 6,415,138 B2 * | 7/2002 | Sirola et al. .............. 455/90.1 |
| 6,466,292 B1 | 10/2002 | Kim |
| 6,483,498 B1 * | 11/2002 | Colgan et al. .............. 345/173 |
| 6,577,496 B1 * | 6/2003 | Gioscia et al. .............. 361/681 |
| 2002/0021258 A1 | 2/2002 | Koenig |
| 2002/0021622 A1 | 2/2002 | Baroche |
| 2003/0114200 A1 | 6/2003 | Lee |
| 2004/0165060 A1 | 8/2004 | McNelley |

FOREIGN PATENT DOCUMENTS

| | | |
|---|---|---|
| WO | 00/59179 | 10/2000 |
| WO | 00/79372 A1 | 12/2000 |
| WO | 01/53919 A2 | 7/2001 |

* cited by examiner

FLEXIBLE SCREEN DISPLAY WITH TOUCH SENSOR IN A PORTABLE COMPUTER

CROSS REFERENCE TO RELATED APPLICATION

This application is a Continuation-in-Part and claims priority and benefit to co-pending U.S. patent application Ser. No. 09/728,023, filed on Nov. 30, 2000, by Francis Canova Jr., and entitled "MULTI-SIDED DISPLAY FOR PORTABLE COMPUTER," which is incorporated herein by reference.

BACKGROUND OF THE INVENTION

1. Field of the Invention

The present invention relates to a user interface for a portable electronic device. More particularly, the present invention provides a user interface with flexible display panel capabilities and flexible touch sensor capabilities for portable electronic devices.

2. Related Art

Advances in computer technology have enabled the further miniaturization of the components required to build computer systems. As such, new categories of computer systems have been created. One of the newer categories of computer systems is the portable, hand held, or "palmtop" computer system, also referred to as a personal digital assistant or PDA. Other examples of a portable computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

The continuing miniaturization of computer systems enables a user to now carry in their pocket the equivalent of a computer system that once occupied an entire room. The miniaturization has also reduced the functionality of the palmtop computer system. To support the diminutive form factor of the palmtop computer, certain functions and components normally associated with full sized computers have been reduced or eliminated.

One of the components whose functionality has been reduced is the display panel. To comply with the form factor of the portable computer, smaller graphic panels with reduced graphic resolution have been developed. By virtue of reducing both the size of the display panel and the resolution thereof, less information is now visible to the user.

Additionally, another drawback to the portable computer is the display panel itself. While utilization of the liquid crystal display (LCD) has, in part, enabled the further development of the portable computer system, it is not without some limitations. An LCD is constructed using glass, and as such, is thick, rigid, and relatively heavy for its size. Additionally, liquid crystal displays are usually visible from one position, and as such, the information displayed is often difficult to see. Another drawback is that some LCDs require backlighting for illumination of the display area which is a constant draw on the retained power within a portable computer.

The keyboard, another component that is normally associated with a full sized computer, has, in this instance, been completely eliminated from the form factor of the portable computer. By eliminating the keyboard or alphanumeric input device, an alternative means or device that would enable a user to enter and/or manipulate data had to be developed. One such device that was developed to overcome the elimination of the keyboard, while still conforming to the form factor of the portable computer, is the touchable panel, or touch screen. In essence, the touch panel enables registration and interpretation of contact between the panel and the tip of a stylus utilized by a user. As shown in FIG. 1 (Prior Art), the touch panel is disposed on the top surface area of the LCD, such that it is accessible to the user.

FIG. 1 (Prior Art) is an cross-sectioned illustrated view of exemplary touch panel/LCD device 9. Frame structures 11L and 11R as well as supporting shelves 12L and 12R and 13L and 13R are disposed, respectively, along the left and right sides of touch panel/LCD 9. Supporting shelves 12L and 12R are designed to provide edge support for top film component 14. Supporting shelves 13L and 13R are designed to provide edge support for substrate component 16.

FIG. 1 (Prior Art) further depicts, from top to bottom, the various components that comprise touch panel/LCD 9, which is a combination of touch screen 10 and LCD 20. Touch screen 10 is comprised of layers 14, 15, and 16. Commencing at the top and moving downward, top film layer 14 is shown. Top film layer 14 is the surface of touch panel/LCD 9 that is contacted by the user's stylus. Spacer layer 15 is shown as disposed below top film layer 14. Substrate layer 16 is shown as disposed beneath spacer layer 15. LCD 20, shown as disposed beneath substrate layer 16 is comprised of layers 17, 18, and 19. Thermotropic liquid crystal layer 18 is shown as sandwiched between upper glass layer 17 and lower glass layer 19. Backlighter 21, shown as disposed at the bottom of touch panel/LCD 9, provides the illumination thereof. In another exemplary example, backlighter 21 may be repositioned below substrate 16 and above upper glass layer 17, and, accordingly, is termed frontlighting, due to its orientation relative to LCD 20.

It should be appreciated that in the exemplary touch panel/LCD device, as depicted in FIG. 1 (Prior Art), inherent drawbacks are present. One drawback is the overall height of touch panel/LCD 9, which is approximately four millimeters, making it relatively thick for a portable computer system.

Another drawback is that, because of the amount of space between the touch surface of the touch screen and LCD, there is what is commonly referred to as the parallax effect. Simply stated, the parallax effect is a type of visual spatial distortion such that the actual point of contact on the touch screen does not correspond to the intended target area of the LCD. This is analogous to a stick being immersed in water, such that the stick takes on a bent or distorted appearance.

An additional drawback is that the amount of light that comes from the LCD through the touch screen to be viewed by the user is only about 80% of the available light. In a reflective display, that amount is further reduced to about 64%. This reduces the overall contrast, clarity, and quality of the display as seen by the user.

SUMMARY OF THE INVENTION

Thus, a need exists for a user interface which overcomes the disadvantages of an LCD (liquid crystal display) in a portable electronic device and which provides touch screen functionality such that the visual quality of the display device is not diminished. An additional need exists for a user interface that fills the above need and which substantially reduces the parallax effect, such that the intended target within the display device is the actual point of contact. An additional need exist for a user interface that fills the above needs while reducing overall height requirements of the portable computer system.

Accordingly, the present invention provides a user interface which overcomes the disadvantages of an LCD (liquid crystal display) for a portable electronic device. The present invention further provides, in one embodiment, a user interface that achieves the above listed accomplishment and which provides a flexible display panel. Furthermore, the present invention also provides a user interface that provides the above listed features and which further provides a flexible touch sensor. Additionally, the present invention provides a user interface that provides the above listed features while reducing the overall height requirement of the electronic device. The present invention further provides a user interface that provides the above listed features while preventing the quality of the display from being diminished. The present invention additionally provides a user interface that provides the above listed features and which eliminates the parallax effect.

The present invention provides a user interface which overcomes the disadvantages of an LCD (liquid crystal display) for a portable electronic device. In one embodiment, the present invention is comprised of a flexible display panel. The flexible display panel is coupled with the portable electronic device. In the present embodiment, the present invention is further comprised of a flexible touch sensor. The flexible touch sensor is coupled to the flexible display panel. In the present embodiment, the flexible touch sensor is operable to register a position where contact is made with a surface of the user interface, wherein a particular position on the user interface is translated into a particular command for controlling the portable electronic device. In the present embodiment, the flexible touch sensor is disposed beneath the flexible display panel.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
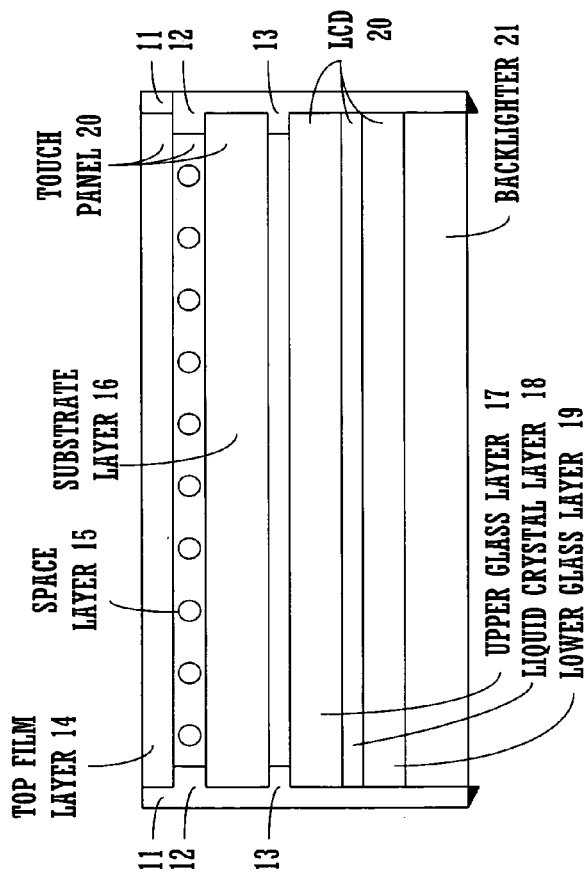
FIG. 1 (Prior Art) illustrates a cross-section of an exemplary touch screen incorporated with an LCD, in accordance with one embodiment of the present invention.

A user interface for a portable computer system. In one embodiment, the user interface comprises a flexible display panel. In one embodiment, the user interface comprises a flexible touch sensor. In one embodiment, the flexible display panel is disposed above the flexible touch sensor. In one embodiment, the technology employed in the fabrication of the flexible display panel is electronic paper technology. In the following description, for purposes of explanation, numerous specific details are set forth in order to provide a thorough understanding of the present invention. It will be obvious, however, to one skilled in the art that the present invention may be practiced without these specific details. In some instances, well-known structures and devices are shown in block diagram form in order to avoid obscuring the present invention. In other instances, well-known methods, procedures, component, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "activating" or "deactivating" or "ascertaining" or "identifying" or "determining" or "indicating" or "transmitting" or "relaying" or "performing" or "translating" or "sending" or "touching" or "implementing" or "disabling" or "enabling" or "displaying" or "controlling" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are discussed primarily in the context of a portable computer system, such as a palmtop or personal digital assistant. However, it is appreciated that the present invention can be used with other types of portable electronic devices that utilize a flexible panel display device, including but not limited to palmtop computer systems, pagers, cell phones, remote web browsers, remote control devices, etc.

Exemplary Palmtop Platform

Figure 2A:
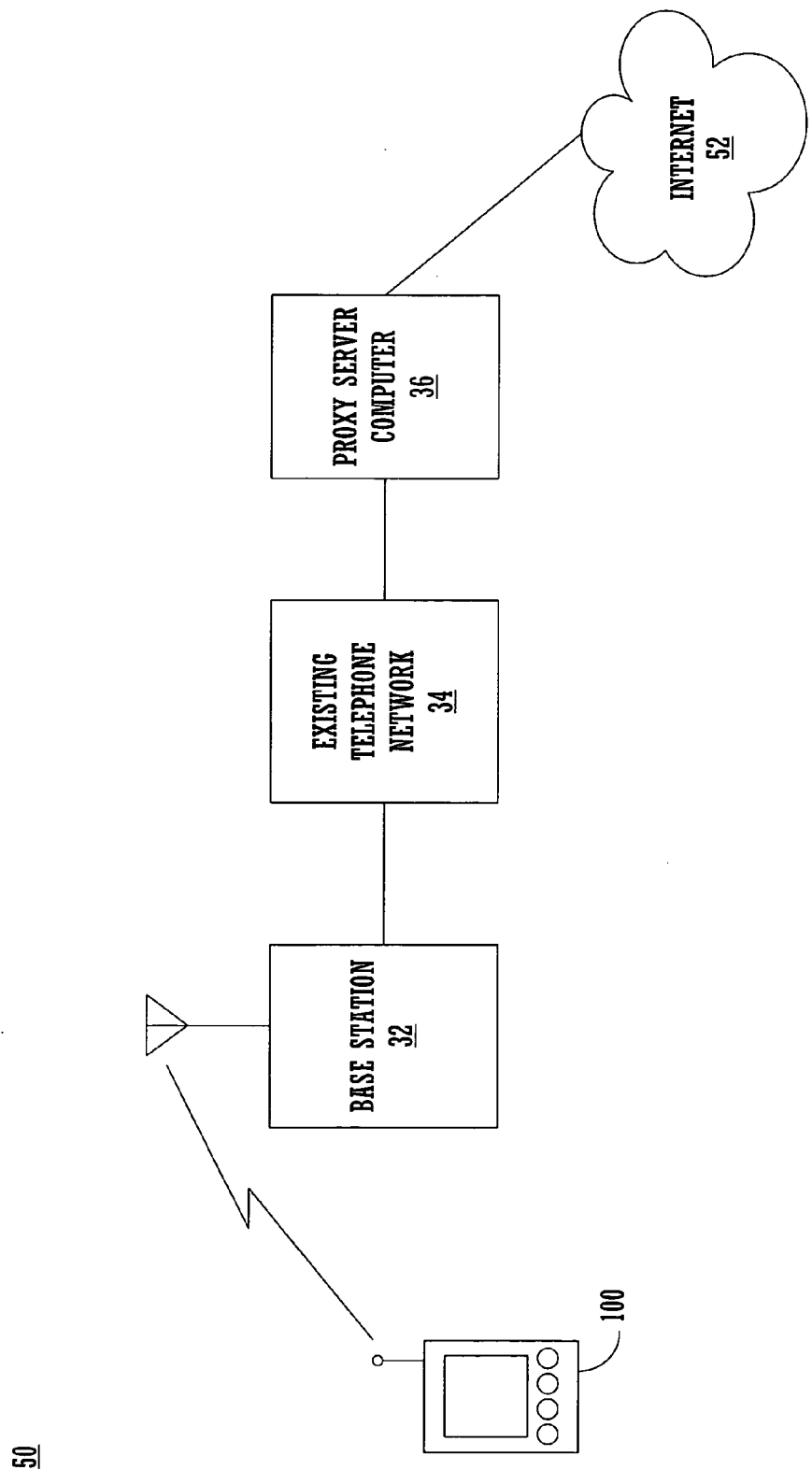
FIG. 2A is a block diagram of an exemplary network environment including a portable computer system, in accordance with one embodiment of the present invention.

FIG. 2A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices which may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 2A, the existing telephone network could also be a packet-based network, utilized by some conventional portable computer systems. However, a wireless communication interface is utilized to communicate data and information between portable computer system 100 and base station 32. It should be appreciated that one embodiment of a wireless communication system in accordance with the present invention is the Mobitex wireless communication system. Furthermore, any wireless network, in addition to the Mobitex wireless network, can support the functionality to be disclosed herein.

Figure 2B:
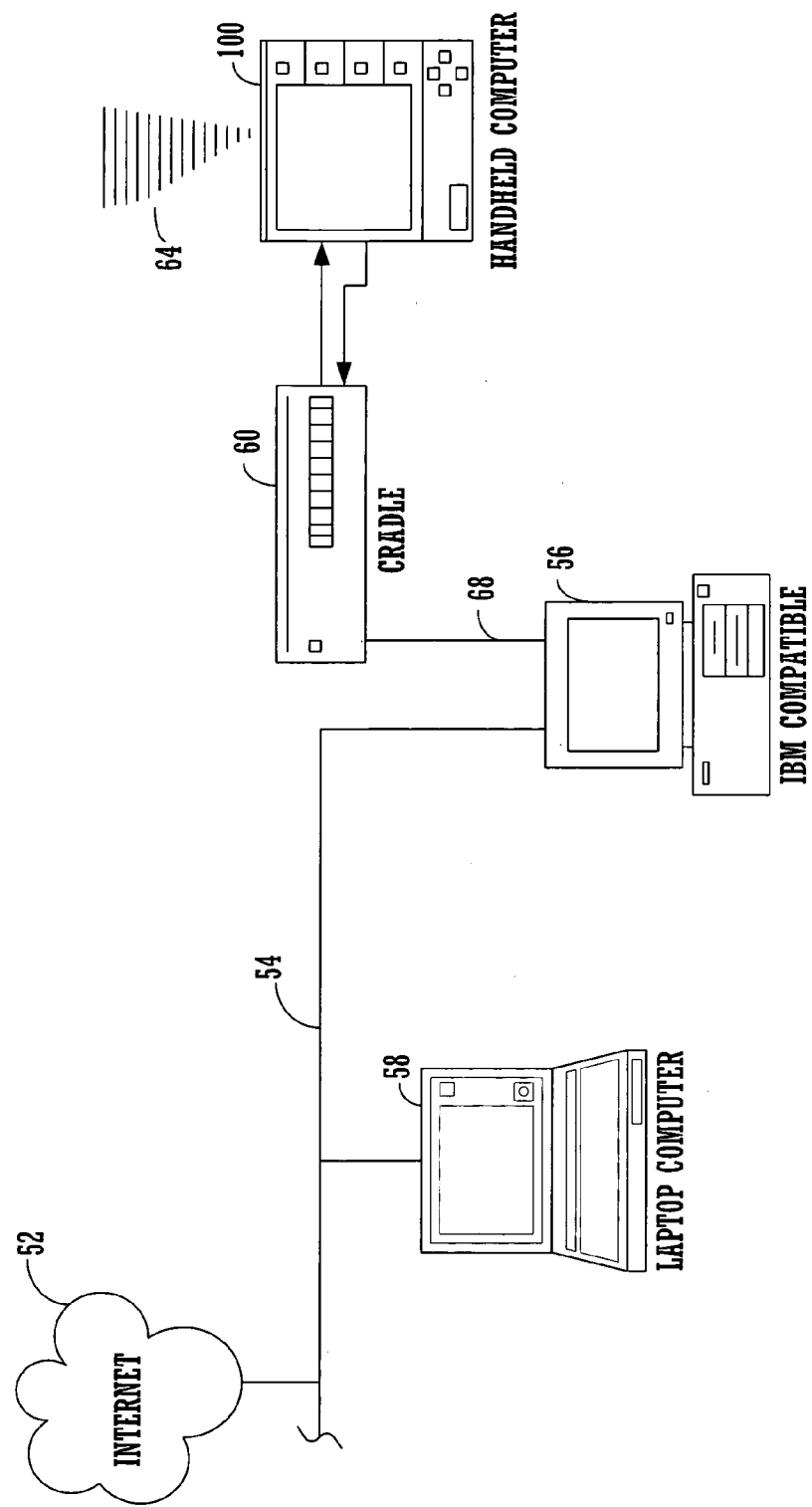
FIG. 2B is a block diagram of a portable computer system connected to other computer systems and the Internet via a cradle device, in accordance with one embodiment of the present invention.

FIG. 2B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 2B, the existing telephone network could also be a packet-based network, utilized by some conventional portable computer systems.

With reference to both FIGS. 2A and 2B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 3A:
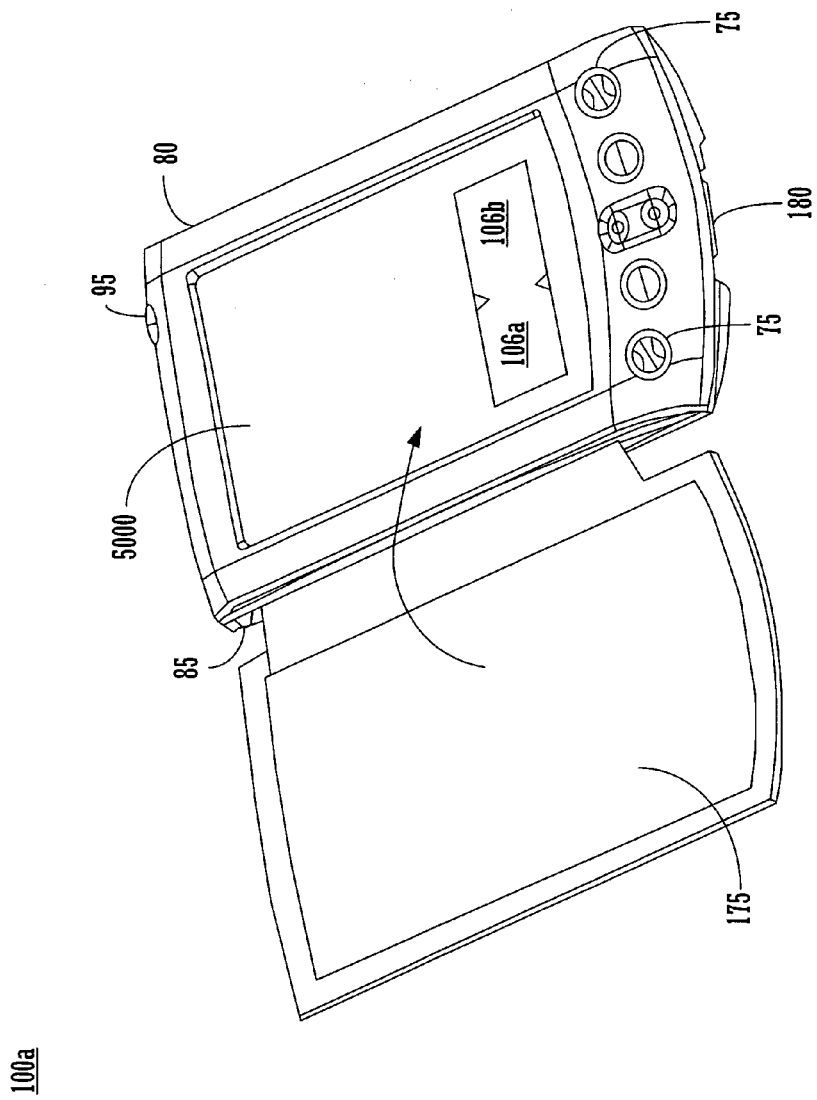
FIG. 3A is a top side perspective view of a portable computer system configured with a front cover, in accordance with one embodiment of the present invention.

FIG. 3A is a perspective illustration of the top face 100a of one embodiment of the palmtop computer system 100 of the present invention. The top face 100a contains a display screen 5000 surrounded by a bezel or cover. A removable stylus 80 is disposed along the right side of portable computer system, but by virtue of the angle of the illustration, is not shown. The display screen 5000 is a flexible display panel able to register contact between the screen and the tip of the stylus 80. The stylus 80 can be of nearly any material to make contact with the screen 5000. The top face 100a also contains one or more dedicated and/or programmable buttons 75 for selecting information and causing the computer system to implement functions. The on/off button 95 is also shown.

Figure 3B:
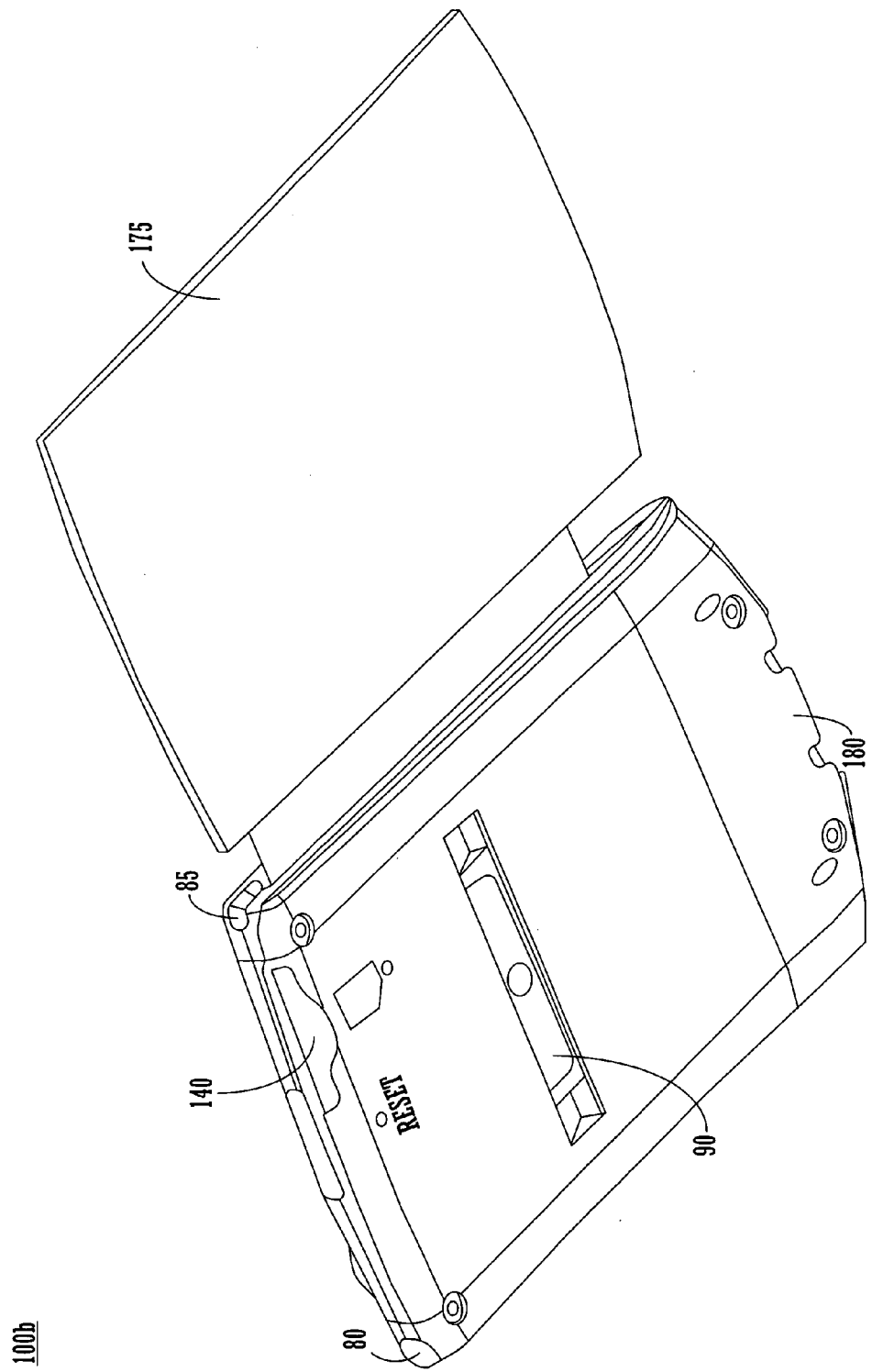
FIG. 3B is a bottom side perspective view of the palmtop computer system of FIG. 3A.

It should be appreciated that in one embodiment of the present invention, portable computer system 100 may be equipped with a front cover 175, adapted to provide protection against damage to display screen 5000, and removeably coupled to portable computer 100, as shown in FIGS. 3A and 3B.

It should be appreciated that when portable computer 100 is equipped with a front cover 175, in one embodiment of the present invention, front cover 175 may rotate as shown by the arrow, about the axis, or hinge, as shown in FIGS. 3A.

In another embodiment of the present invention, portable computer 100 may be equipped with a front cover 300 that is configured with a multi-sided two-sided flexible display panel integral with the front cover, such that there is a front flexible display panel and a rear flexible display panel.

Figure 7:
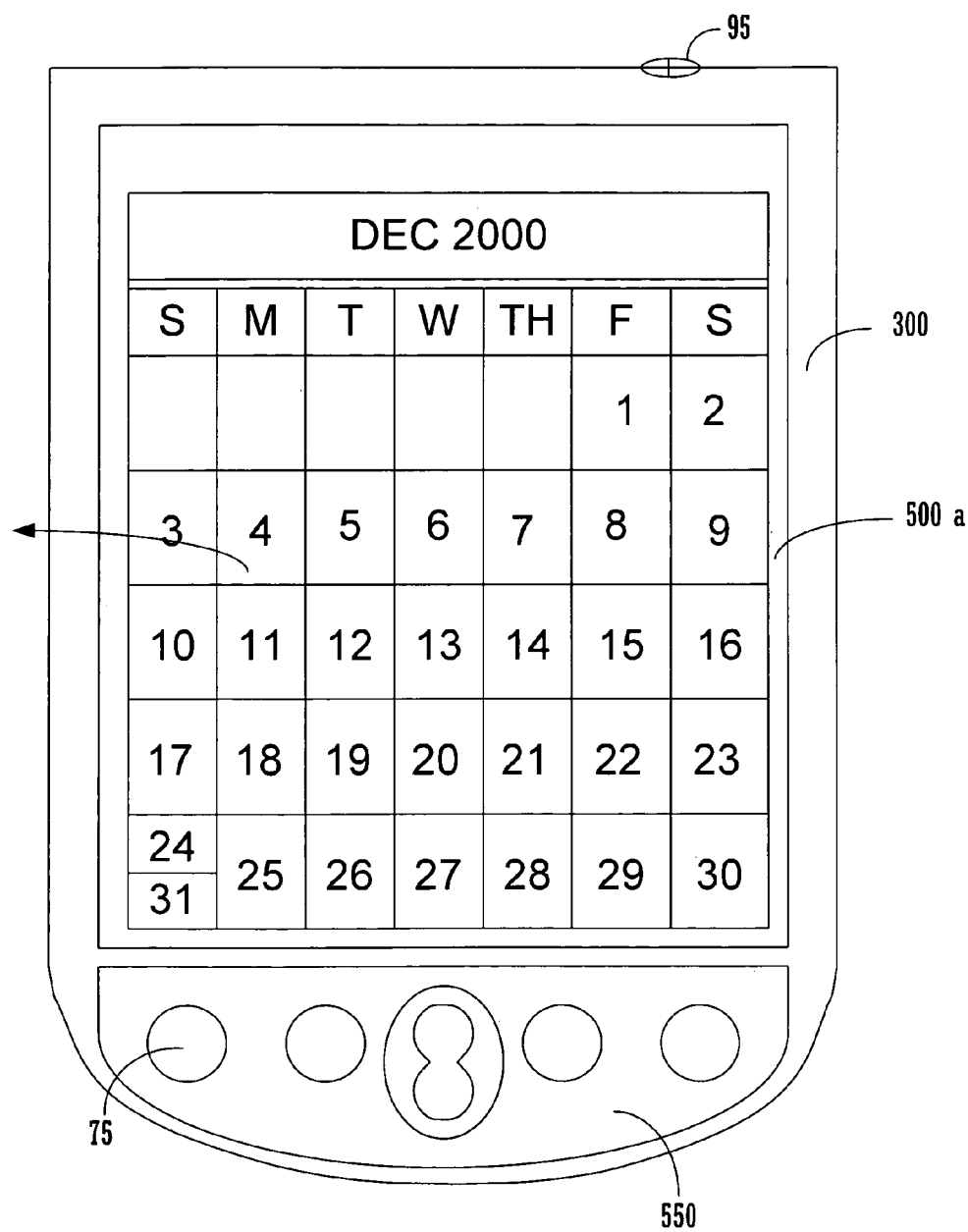
FIG. 7 illustrates a front perspective view of a portable computer system configured with a two-sided flexible display panel disposed integral with the front cover such that the front flexible display panel of the front cover is visible, in accordance with one embodiment of the present invention.

It should be appreciated that when portable computer 100 is equipped with a front cover 300, in one embodiment of the present invention, front cover 300 may rotate as shown by the arrow, about the axis, or hinge, as shown in FIG. 7.

FIG. 3A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on display module 5000 for verification and/or modification.

FIG. 3B is a rear angled perspective illustration 100b of the black face and the back of front cover 175 of portable computer system 100 of FIG. 3A, in one embodiment of the palmtop computer system that can be used in accordance with various embodiments of the present invention. An extendible antenna 85 is shown, and also a battery storage compartment door 90 is shown. Portable computer system 100 is shown as having optional data storage device receptacle 140, adapted to receive optional data storage devices, e.g., memory sticks, secure data cards, and the like. A communication interface 180 is also shows. Also shown is front cover 175. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 3C:
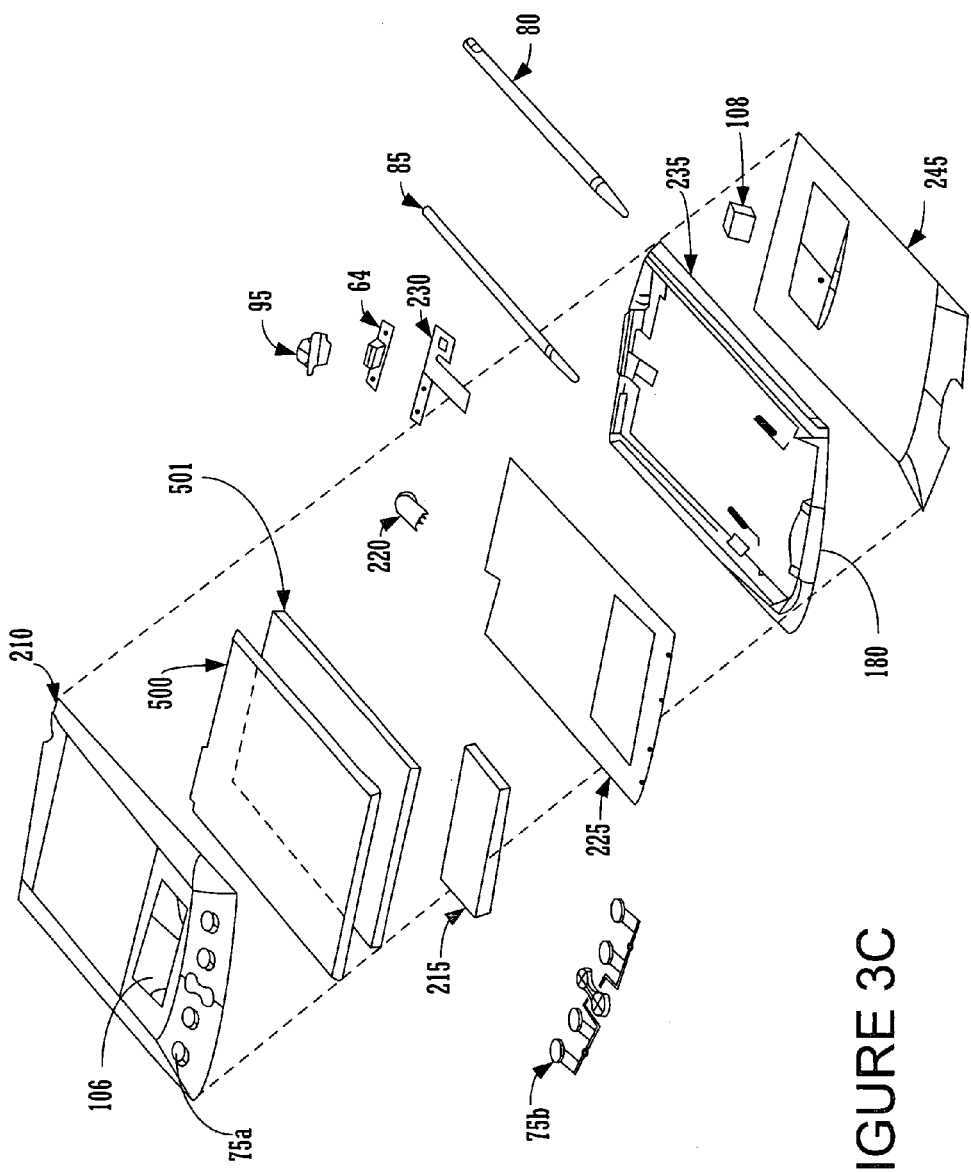
FIG. 3C is an exploded view of the components of the portable computer system of FIG. 3A.

FIG. 3C is an exploded view of the palmtop computer system 100 in accordance with one implementation. It should be noted that front cover 175, as depicted in FIGS. 3A and 3B, is not shown so as to simplify the description of the exploded view of portable computer 100. Computer system 100 contains a back case half 245, and a front case half 210 having an outline of region 106 and holes 75a for receiving buttons 75b. Flexible display panel 500 is disposed on front case half 210, analogous to the flexible display panel of FIG. 3A. Disposed beneath flexible display panel 500 is flexible touch sensor 501. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 2B). A signal (e.g., radio) receiver/transmitter device 108 is also shown. The receiver/transmitter device 108 is coupled to the antenna 85 and also coupled to communicate with the PC board 225. In one implementation a wireless communication system is used to provide two-way communication between computer system 100 and other networked computers and/or the Internet via a proxy server (see FIG. 2A).

Figure 3D:
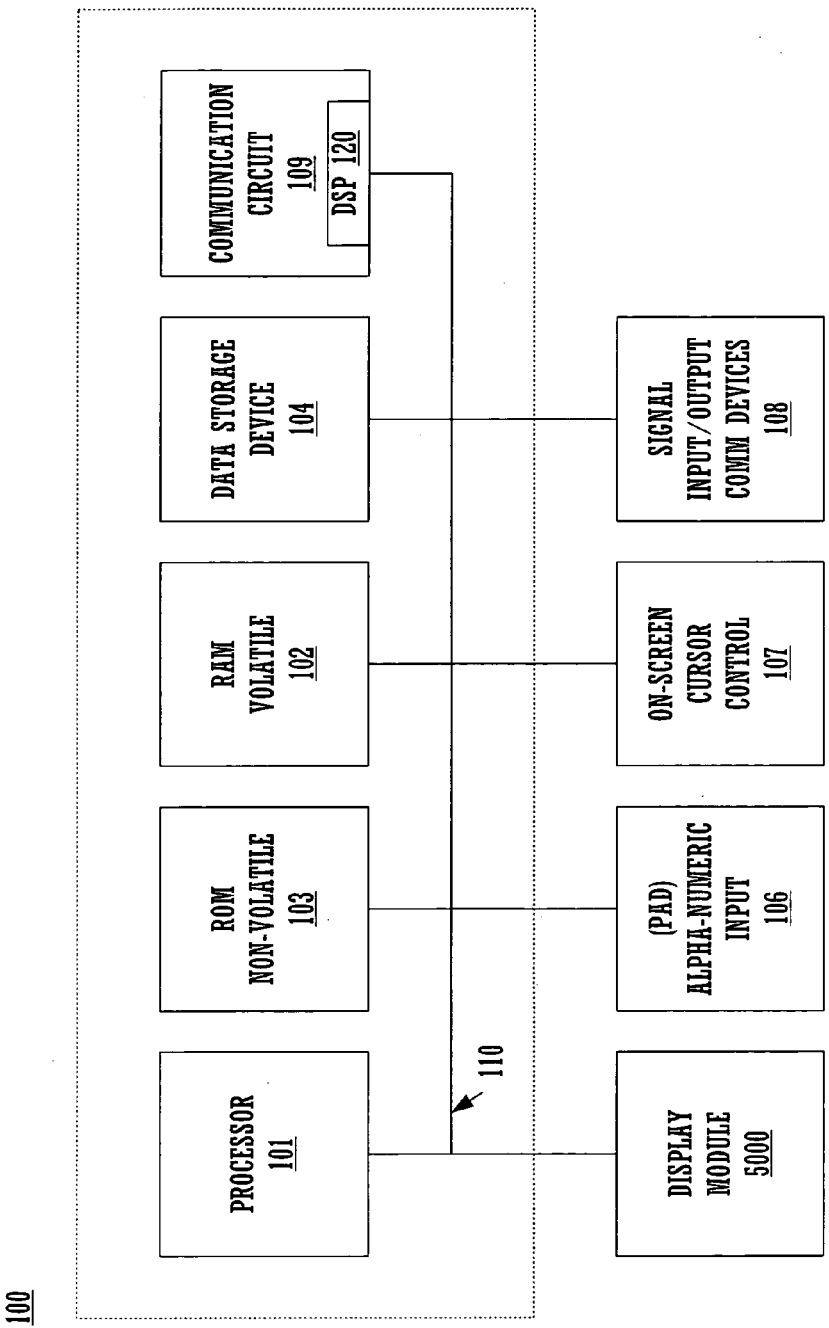
FIG. 3D is a block diagram of the components and circuitry of the portable computer system in FIG. 3A, in accordance with one embodiment of the present invention.

FIG. 3D is a functional block diagram of computer system 100, some of which can be implemented on PC board 225 (FIG. 3C). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains display module 5000 (e.g., flexible display panel 500) coupled to the bus 110 for displaying information to the computer user. PC board 225 can contain the processor 101, the bus 110, the ROM 103 and the RAM 102.

With reference still to FIG. 3D, computer system 100 also includes a signal transmitter/receiver device 108, which is coupled to bus 110 for providing a physical communication link between computer system 100, and a network environment (e.g., network environments 50 and 51 of FIGS. 2A and 2B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 3C) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 3D is an optional alphanumeric input device 106 that in one implementation is a handwriting recognition pad ("digitizer") having regions 106a and 106b (FIGS. 3A and 3C), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a flexible touch sensor 501 (FIG. 3C) incorporated with flexible display panel 500. On-screen cursor control device 107 (e.g., flexible touch sensor 501) is capable of registering a position on display panel 500 where the stylus makes contact. Display module 5000 is suitable for generating graphic images and alphanumeric characters recognizable to the user. In the preferred embodiment, display module 5000 is a flexible display panel.

Figure 4:
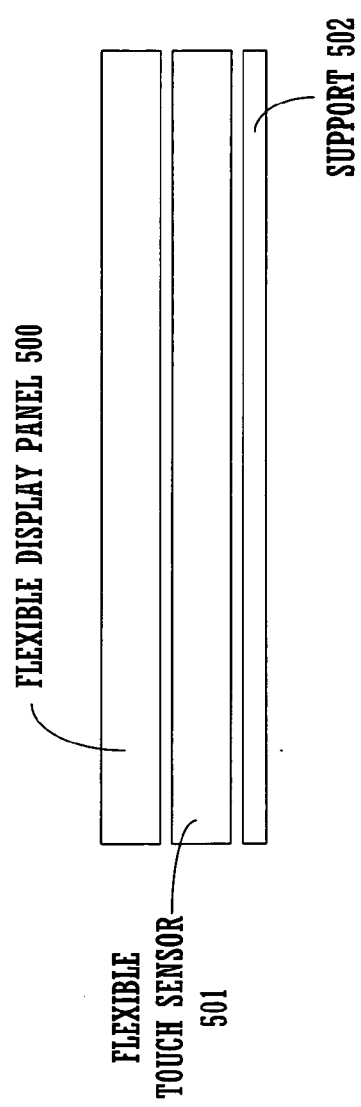
FIG. 4 illustrates a cross-section of the display panel, including the flexible touch sensor, of the portable computer system of FIG. 6 and the display panel mounted to the portable computer system of FIG. 8, in accordance with one embodiment of the present invention.
Figure 6A:
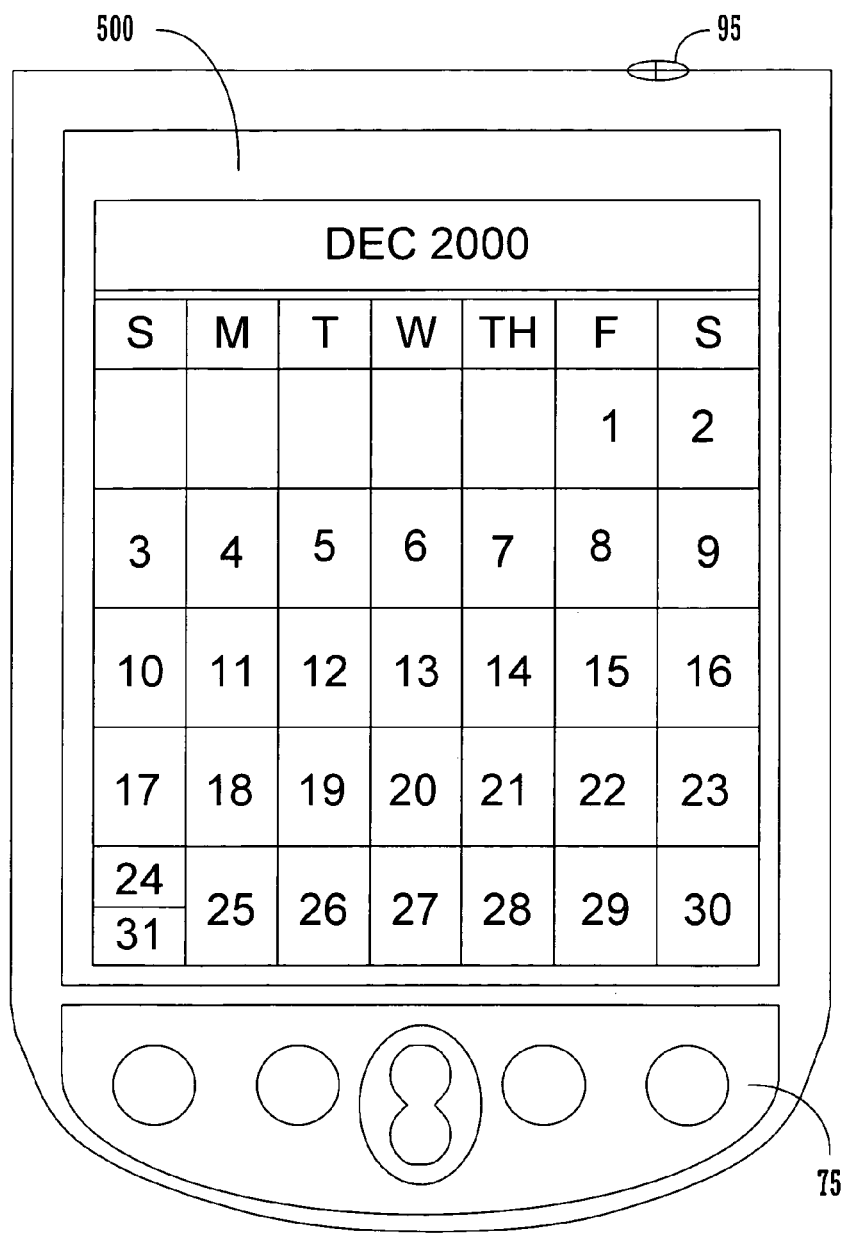
FIG. 6A illustrates a front perspective view of a portable computer system configured with a display component mounted to the portable computer system, in accordance with one embodiment of the present invention.

FIG. 4 is a cross-section illustrated perspective of display module 5000 of palmtop computer 100 in FIG. 6A, in one embodiment of the present invention. Flexible display panel 500 is shown as disposed on top of flexible touch sensor 501. By disposing flexible display panel 500 on top of flexible touch sensor 501, the full viewing functionality and capacities of the display are retained. Unlike those devices where the touch panel is disposed on top of the display screen, in this embodiment of the present invention, there is no loss of illumination or resolution. Further, by virtue of disposing flexible display panel 500 on top of flexible touch sensor 501, the parallax effect (the perceived distortion of an immersed object) has also been eliminated.

Electronic paper, employed in the fabrication of the flexible display panel 500, is a new technology. Electronic paper, flexible to the point of being bendable without compromising function, comprises a sealed chamber filled with a colored liquid (e.g., a black colored liquid), electrostatically charged encapsulated colored particles (e.g., white particles) that are responsive to an applied voltage, and transparent conductors, adapted to conduct an applied voltage, that are disposed within, and near the outer surface of, the sealed chamber. The applied voltage, conducted through the transparent conductors, attracts the electrostatically charged white particles, thereby displacing the colored (black) liquid, such that the electrostatically charged white particles, through the application of a voltage, take the shape and form of graphics and/or characters.

It should be appreciated that in another embodiment of the present invention, different colored liquids and/or different colored particles may be implemented, such that color functionality is achieved and displayable.

It should also be appreciated that in another embodiment of electronic paper, a liquid crystal e.g., a polymer liquid crystal based electronic paper display may be implemented in the present invention. It should be further appreciated that other types of liquid crystals may be utilized in the present invention.

Still referring to FIG. 4, directly below flexible display panel 500 is flexible touch sensor 501. Flexible touch sensor 501 is adapted to respond to flexible display panel 500 being contacted with a stylus, a finger, a fingernail, or other pointing implement, utilized by a user.

In one embodiment, the technology employed in the fabrication of flexible touch sensor 501 is electronic fabric technology. Electronic fabrics are comprising of conductive fibers that are adapted to conduct electrical impulses that are in response to a contact with the fabric. Electronic fabrics can be designed to provide various levels of responsiveness and output. In one example, the conductive fibers enable the sensor to detect a particular point of contact. In another example, the conductive fibers may enable the sensor to detect not only the particular point of contact, but also the amount of pressure applied at that point of contact. In another embodiment, the technology employed in the fabrication of the flexible touch sensor may be analog resistive touch technology.

Referring still to FIG. 4, in the present embodiment, disposed beneath flexible touch sensor 501 is optional support shelf 502. Support shelf 502 can be used to protect flexible display panel 500 and flexible touch sensor 501 against puncture. For example, writing on a piece of paper where there is no backing/support such as, e.g., the surface of a desk or a piece of cardboard, it is very easy to puncture the sheet of paper. If, however, a backing/support is utilized, the chance of puncturing the sheet of paper is basically eliminated. This is the function of optional support shelf 502, which provides backing to flexible display panel 500 and flexible touch sensor 501. In one embodiment, mid frame 235 may be utilized as support shelf 502. In another embodiment, PCB 225 may be utilized as support shelf 502. It should be appreciated that, as shown in FIG. 4, the overall height of the cross-section, including the flexible display panel, the flexible touch sensor, and the support shelf, is approximately 1 millimeter, or about one quarter the thickness of the prior art.

Figure 5A:
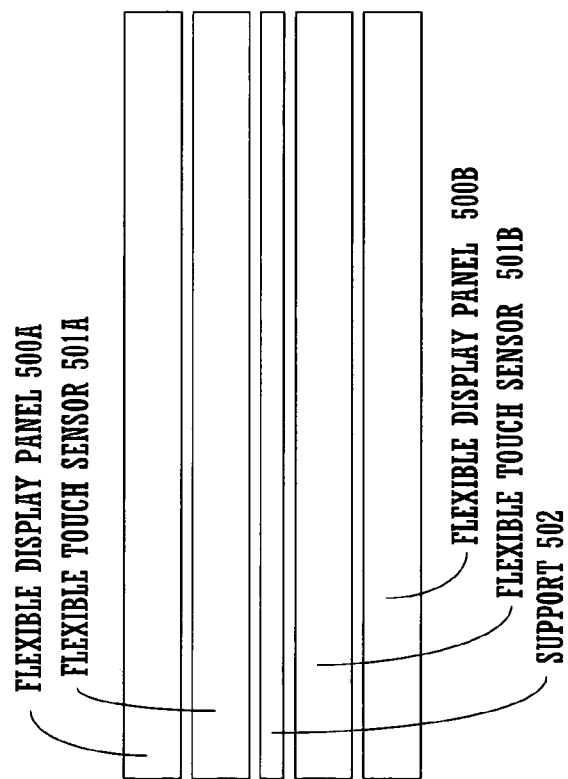
FIG. 5A illustrates a cross-section of a two-sided flexible display panel, including the flexible touch sensor, of the portable computer system of FIGS. 7 and 8, in accordance with one embodiment of the present invention.
Figure 8A:
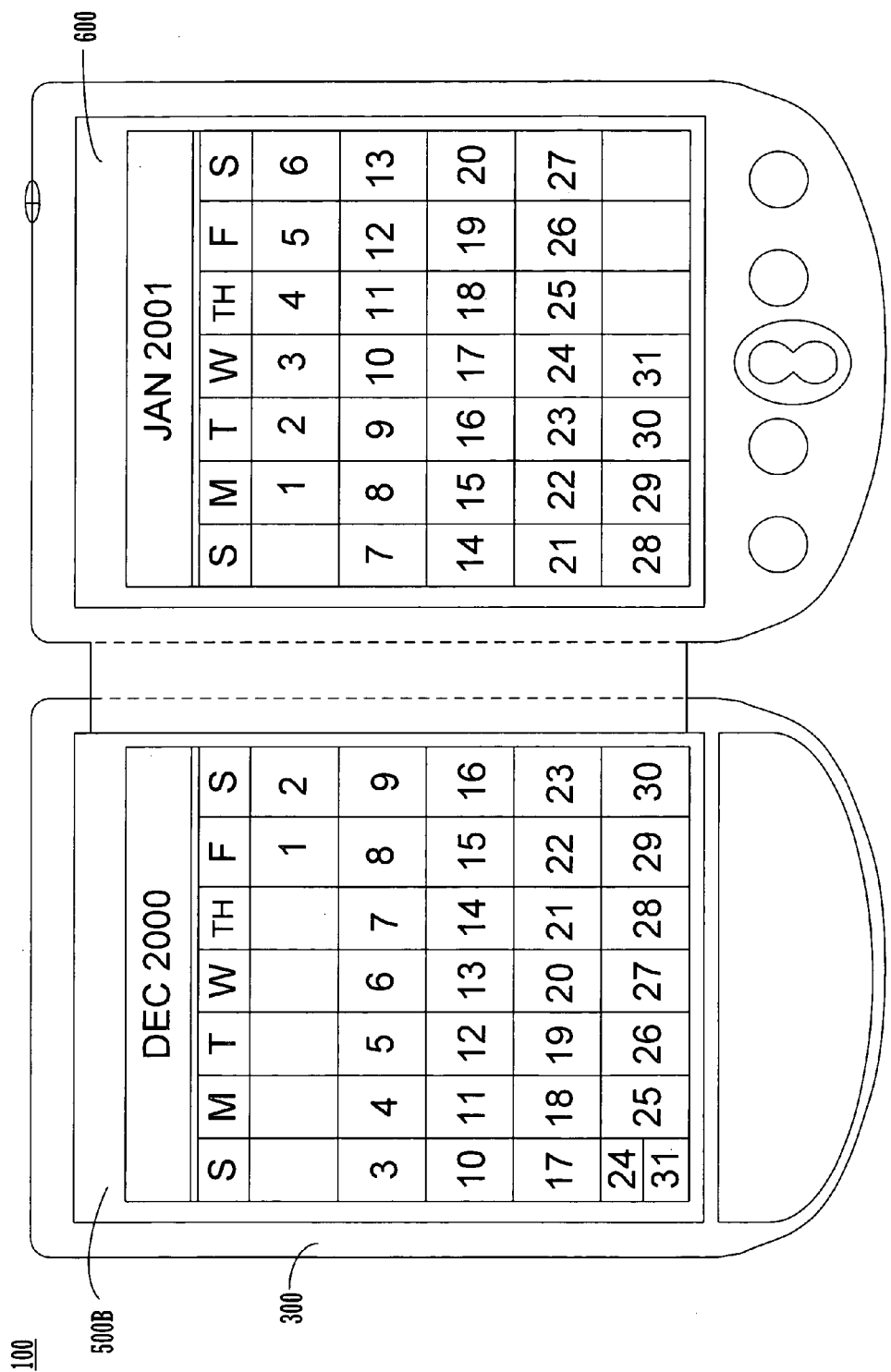
FIG. 8A is a front facing illustrated perspective view of the portable computer system of FIG. 7 with the front cover opened, exposing the second display panel of the front cover and another display panel mounted to the portable computer system, in accordance with one embodiment of the present invention.

FIG. 5A is a cross-section illustrated perspective of palmtop computer 100 as shown in FIGS. 7 and 8A, in another embodiment of the present invention. Flexible display panel 500A is analogous to flexible display panel 500A of FIG. 7. In this embodiment, flexible display panel 500A is disposed on top of flexible touch sensor 501A. Flexible touch sensor 501A is adapted to respond to flexible display panel 500A being contacted by a stylus, or appropriate touching implement, utilized by a user. Beneath flexible touch sensor 501A is optional support shelf 502. Beneath support shelf 502 is flexible touch sensor 501B. Flexible display panel 500B, analogous to flexible display panel 500B of FIG. 8A, is disposed below fabric touch sensor 501B. Flexible touch sensor 501B is adapted to respond to flexible display panel 500B being contacted by a stylus utilized by a user. It should appreciated that, while in the context of the disclosure, the fabric touch sensor is depicted and described as disposed beneath the flexible display panel, in other embodiments of the present invention the fabric touch sensor may be disposed above the flexible display panel.

It should be appreciated that, in this embodiment of the present invention, many thin materials may be used in the construction of optional support shelf 502. It should further be appreciated that in the described embodiments of the present invention, the optional support shelf is shown as being present. However, in another embodiment, optional support shelf 502 may not be present. In one embodiment, support shelf 502 is constructed out of thin molded plastic. In another embodiment, support shelf 502 may be constructed out of aluminum, or other applicable metallic material. In yet another embodiment, support shelf 502 may be constructed out of a resin material. In fact, numerous materials can be used in the construction of support shelf 502. The above list of materials should not be considered exhaustive, but is used to illustrate the variety of materials available which may be used in conjunction with the present invention.

It should be further appreciated that the overall height of the cross-section illustration in FIG. 5A is less than two millimeters. As such, multiple flexible touch sensors, one on top of another, may be implemented in the present invention. Accordingly, in another embodiment of the present invention, the flexible touch sensor could be adapted to be reactive to the pressure of the contact. For example, a light pressured contact may activate one function or operation, a medium pressured contact might activate a second function or operation, and a heavy pressured contact may activate a third function or operation.

Figure 5B:
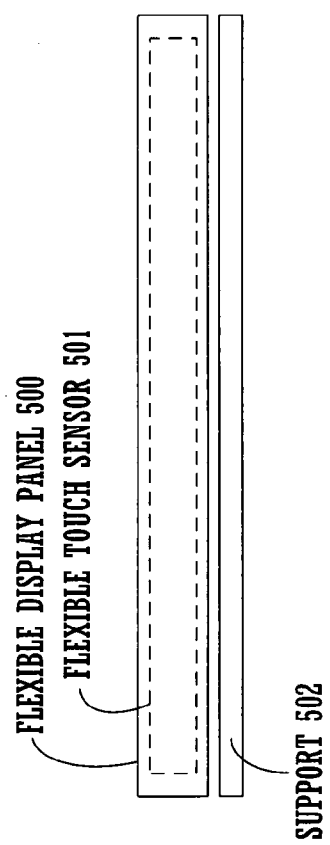
FIG. 5B illustrates a cross-section of a flexible display panel shown as having a flexible touch sensor interwoven within the flexible display panel, in one embodiment of the present invention.

FIG. 5B illustrates a cross-section perspective view of flexible display panel 500 shown as having flexible touch sensor 501 interwoven within flexible display panel 500, in one embodiment of the present invention. Flexible touch sensor 501, as indicated with a dotted line, is shown as disposed within flexible display panel 500. Support shelf 502 is disposed beneath flexible panel 500.

In the preferred embodiment, electronic paper technology is employed in the formation of the two sided display component and the flexible flat display panel discussed herein. The components, functions, and processes that comprise electronic paper are referenced in the co-pending patent application assigned to the assignee of the present invention, entitled "MULTI-SIDED DISPLAY FOR PORTABLE COMPUTER", by FRANCIS CANOVA JR., filed Nov. 30, 2000, application serial number "11/879,666."

Utilization of the Present Invention

With reference to FIG. 6A, portable computer system 100 is shown in a front facing illustrated perspective. In this embodiment of the present invention, flexible display panel 500 is coupled to the portable computer and disposed upon the body of the portable computer. When a user powers up portable computer 100 by pressing on/off button 95, shown as being disposed on the top surface area of portable computer 100 and oriented toward the right side, display control circuit 200, (FIG. 9) activates flexible flat display panel 500, such that information or data becomes viewable. Additionally activated is flexible touch sensor 501, disposed beneath flexible flat display panel 500, as shown in FIG. 4. In one example, the data viewed is a monthly calendar, e.g., the month of December 2000, as shown in FIG. 6A. It should be appreciated that the data viewed, in another example, could be a GUI (graphical user interface) or other information presented in a fashion associated with a single panel display.

In the present embodiment of the present invention, when a user contacts flexible flat display panel 500 with stylus 80, or other appropriate device, that point of contact is transmitted to flexible touch sensor 501, disposed beneath flexible flat display panel 500 as shown in FIG. 4, for identification. The identified point of contact, transmitted from flexible flat display panel 500 to flexible touch sensor 501, is then relayed to processor 101 of portable computer system 100 (FIG. 3D), such that subsequent additional processes or functions are initiated.

Referring still to FIG. 6A and using the displayed month of December as one example, in one embodiment of the present invention, a user might touch flexible display panel 500 in the region associated with Wednesday, the 20th of December. The contact point would be transmitted to flexible touch sensor 501 disposed beneath flexible touch panel 500. Flexible touch sensor 501 would identify the point of contact, in this instance, Wednesday the 20th, and relay that information to processor 101, thereby initiating a subsequent process. In this example, the subsequent process initiates the displaying of a user's daily planner relating to the touched date, Wednesday the 20th, and is thusly shown in FIG. 6B.

Figure 6B:
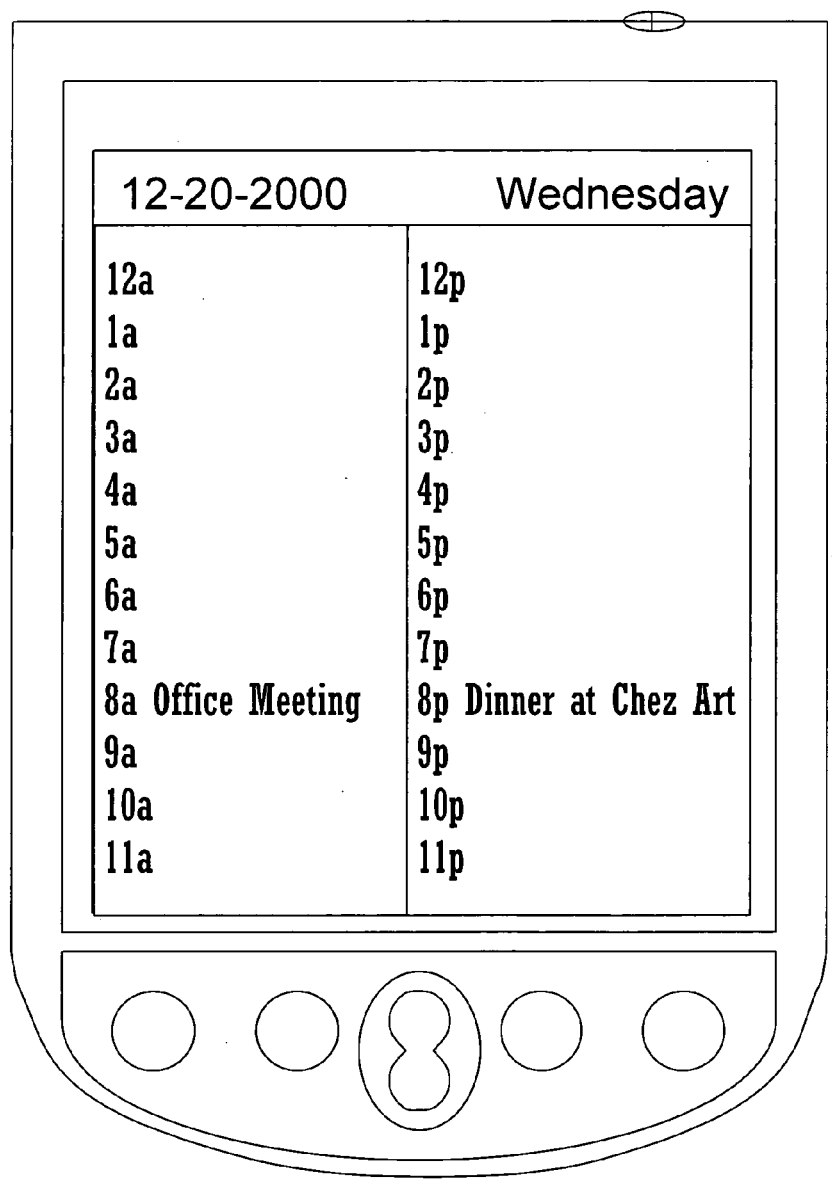
FIG. 6B illustrates a front perspective view of the portable computer system of FIG. 6A in a continuation of the example described in the process initiated in FIG. 6A, in accordance with one embodiment of the present invention.

Referring now to FIG. 6B and continuing with the current example, in one embodiment of the present invention, a user could then touch the area regarding the office meeting scheduled at 8:00 am, and that could trigger another screen to be displayed. This new screen could contain a description of the subject to be discussed in that meeting, and perhaps a listing of the people scheduled to attend.

With reference to FIG. 7, portable computer system 100 is shown in a front facing illustrated perspective view with front cover 300 in the closed (default) position, in one embodiment of the present invention. In this embodiment of the present invention, portable computer 100 is provided with a flexible two-sided display component integral with front cover 300. This two-sided flexible display component has a front flexible display panel 500A and a rear flexible display panel 500B. In this embodiment of the present invention, the technology employed in the fabrication of the flexible display panel is electronic paper technology. On/off button 95 is shown as being disposed on the top surface area of portable computer 100 and oriented on the right side. Region 550, shown as disposed toward the bottom of front cover 300, is adapted to provide access to dedicated and/or programmable buttons 75. In one embodiment of the present invention, when front flexible display panel 500A and flexible touch sensor 501A, disposed beneath front flexible display panel 500A, as shown in FIG. 4, is activated through the pressing of on/off button 95, the information displayed may need to be manipulated, and therefore access to buttons 75 is most advantageous. Front display panel 500A is shown as disposed integral with hinged front cover 300. Front cover 300 may rotate, as shown by the arrow, about the axis. A display control circuit 200 (FIG. 9) is included in portable computer 100 integral with the electronic circuitry within the portable computer, and is adapted to control the activation of the flexible display panels and the flexible touch panels, as described in more detail herein.

Referring to FIG. 7, when a user turns on/powers up palmtop computer 100, display control circuit 200 determines the orientation of front cover 300. If display control circuit 200 (FIG. 9) determines that front cover 300 is in the closed (default) position, it activates front flexible display panel 500A and flexible touch sensor 501A such that information or data becomes viewable. In the example shown, the data viewed is a monthly calendar, e.g., the month of December 2000. It should be appreciated that the data could be any data, e.g., a GUI (graphical user interface) or other information presented in a fashion associated with single panel displays.

Referring now to FIG. 8A, the portable computer 100 of FIG. 7 is shown as having front cover 300 in the open (non-default) position. Rear display panel 500B, on the left, is now visible. Rear panel display 500B is the other display panel contained within front cover 300, and is functionally analogous to front display panel 500A. Display screen 600 is shown on the right, coupled to palmtop computer 100, and is also functionally analogous to either display panel 500A or 500B.

Still referring to FIG. 8A, by virtue of the orientation of front cover 300, display control circuit 200 automatically deactivates originally activated front flexible display panel 500A and flexible touch sensor 501A, and activates rear flexible display panel 500B of front cover 300 and flexible touch sensor 501B, disposed beneath flexible flat display panel 500B, as shown in FIG. 5A. Additionally, display control circuitry 200 activates now visible flexible display panel 600 and flexible touch sensor 601, disposed beneath flexible display panel 600, analogous to flexible display panel 500 and flexible touch sensor 501 of FIG. 6A and FIG. 6B. When front flexible display panel 500A is deactivated, the data or information previously viewable, e.g., the month of December 2000 as shown in FIG. 7, is reoriented so as to be identically viewable on rear flexible display panel 500B, as shown in FIG. 8A. Additionally, flexible display panel 600 is activated thereby providing another viewable screen through which new data or information may be displayed. In the current example, the information is a monthly calendar, e.g., the month of January 2001, and it is shown on the right of FIG. 8. Of course, the user may display any information on either of the multiple display panels.

It should be appreciated that by providing a second display panel to the functionality of a portable computer system, the amount of viewable surface area has been effectively doubled, therefore providing increased functionality to the portable computer system.

In one example, a user may display a calendar on one panel, and notes regarding the calendar on the other. In another example, a user may display a day planner on one panel and information about the daily plans on the other. In yet another example, a user may display the GUI (graphical user interface) on one panel, and have the selected icon's associated application appear on the other screen, reducing the time required to switch back and forth from the GUI to associated applications as is customary when using a conventional portable computer system. In still another example, a user would be able to view a graphic e.g., elongated pictures, wide diagrams, complex and expansive formulas, and the like, in their entirety, no longer having to scroll or switch from one section or screen to another.

In another example, a user may wish to have multiple daily schedules, or multiple weekly, monthly, or yearly calendars displayed, thereby reducing the switching of screens normally associated with portable computers not configured with the present invention. In yet another example, a user may wish to view multiple financial documents, e.g., annual income statements from various years. In another example, a user may wish to view multiple web pages. In still another example, and by utilizing the networking functionalities contained within the portable computer, a user connected and communicating with other individuals via a network, could have information from other portable computers displayed on one or more panels and compared with or integrated into information contained within the other panels. In fact, a portable computer configured with multiple flexible display panels, in one embodiment of the present invention, provides, to a user, an almost endless array of functional configurations.

Figure 8B:
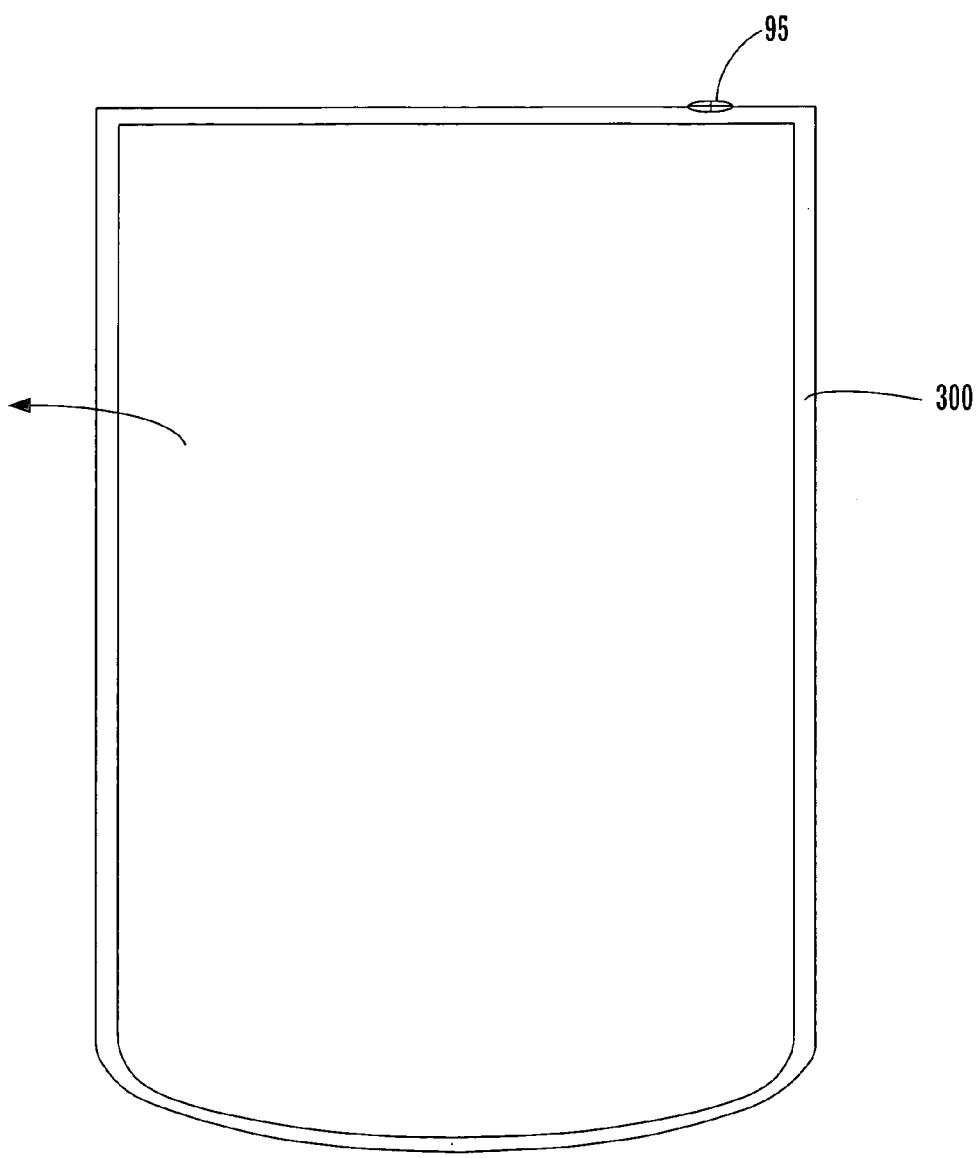
FIG. 8B is a front facing illustrated perspective view of a portable computer system 100 configured with a flexible display panel disposed upon the inside surface of the front cover, and is shown as having the front cover in the closed position, in accordance with one embodiment of the present invention.

FIG. 8B is a front facing illustrated perspective view of portable computer system 100, in one embodiment of the present invention. In this embodiment, front cover 300 is configured with the left side portion of flexible display panel 500 disposed upon the inside surface of the front cover, and as such, is not visible. Additionally, the main body portion of portable computer system 100 is configured with the right side portion of flexible display panel 500. Front cover 300 is adapted to be rotated about the axis or hinge as indicated by the arrow.

Figure 8C:
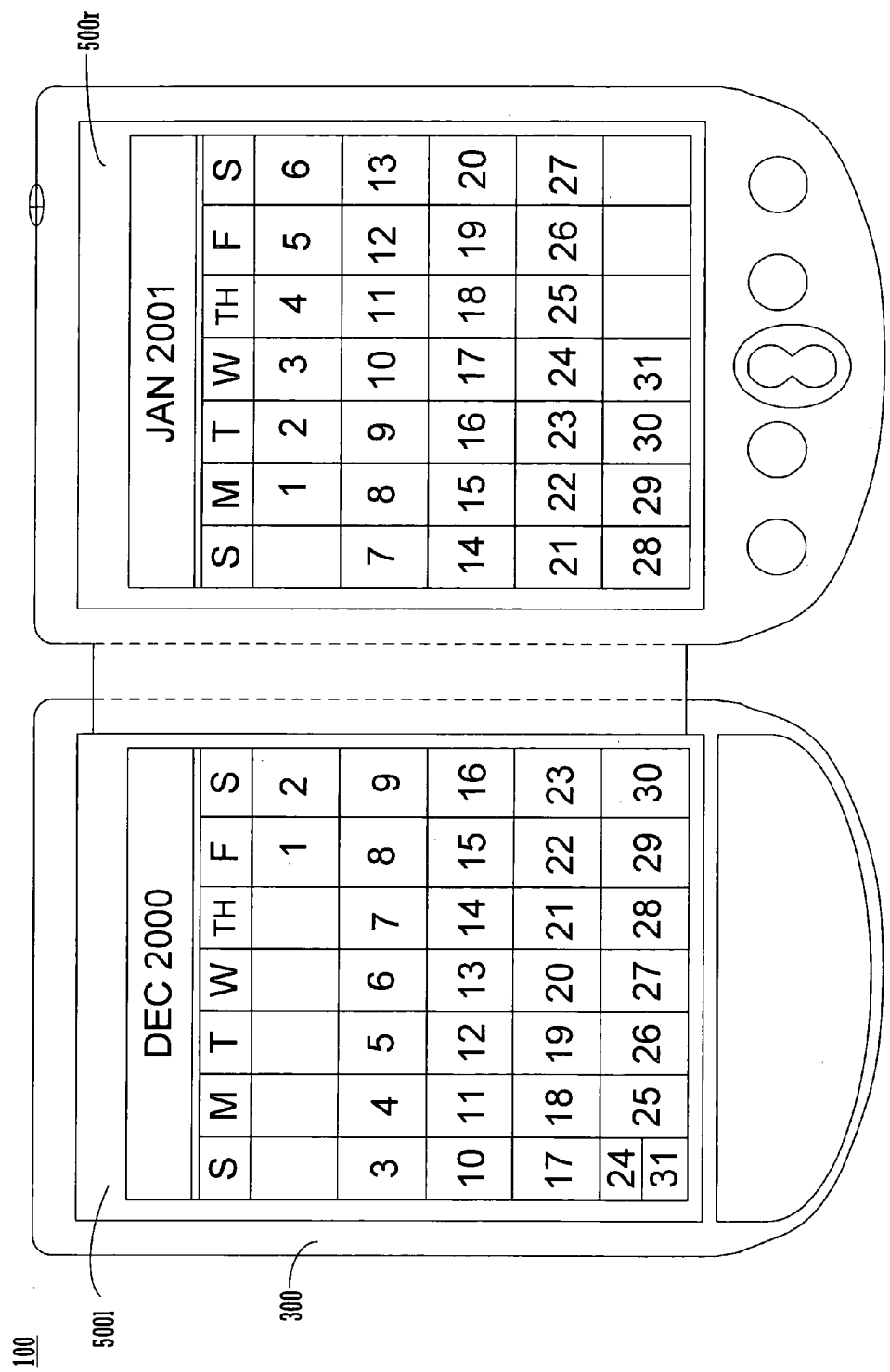
FIG. 8C is a front facing illustrated perspective view of the portable computer system of FIG. 8B with the front cover in the open position.

FIG. 8C shows the portable computer system 100 of FIG. 8B with the front cover 300 in an opened position. In this embodiment, left side portion 500L and right side portion 500R of flexible display panel 500 is not segmented, such that when front cover 300 is in the open position, a contiguous panel display is presented to the user. Shown as being displayed to the user are two calendars, e.g., the months of December 2000 and January 2001 which are analogous to the calendars of FIG. 8A.

Figure 8D:
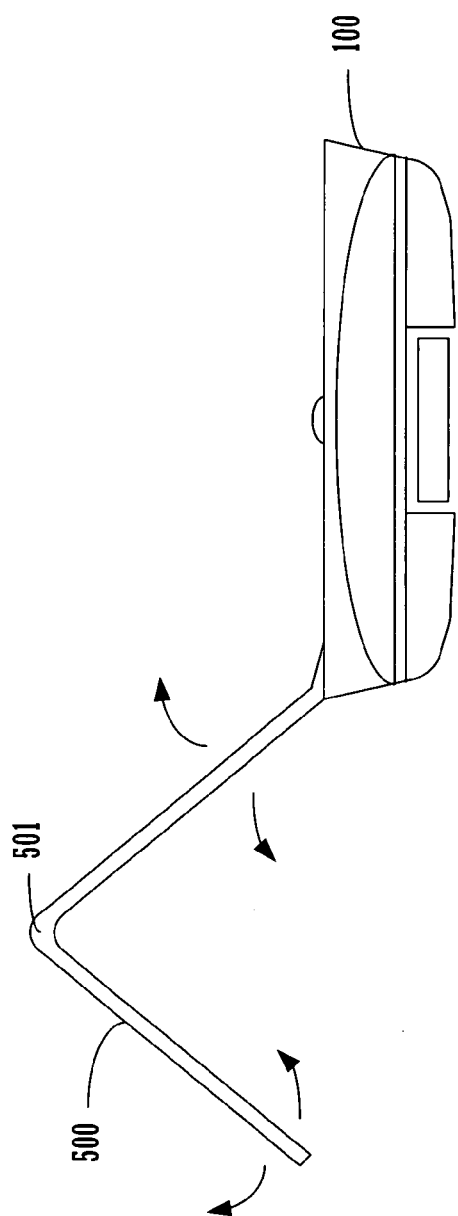
FIG. 8D is a bottom side profile perspective view of a portable computer system having foldable type flexible display panel, in accordance with one embodiment of the present invention.

FIG. 8D is a bottom side profile perspective view of portable computer system 100 configured with a foldable flexible display panel. It should be appreciated that when the foldable display panel is fully extended in the open position, three display panel functionality is achieved. Flexible display portion 500, on the left, is adapted to be rotated about the axis as indicated by the arrows. Flexible display portion 501, on the right, is adapted to rotate about the axis as indicated by the arrows.

It should be further appreciated that while in one embodiment of the present invention, the front cover is shown as configured with a flexible touch panel sensor disposed beneath the flexible touch screen, as described in FIG. 8A, in another embodiment there may be a flexible display panel disposed within the front cover without an accompanying touch sensor. By virtue of the physical properties of the flexible display panel, a flexible touch panel may be disposed within the main body of the portable computer system, such that when stylus contact, or other appropriate contact is made with the flexible display panel disposed within the front cover, the point of contact is transferred to the flexible touch sensor disposed within the main body portion of the portable computer system.

Figure 9:
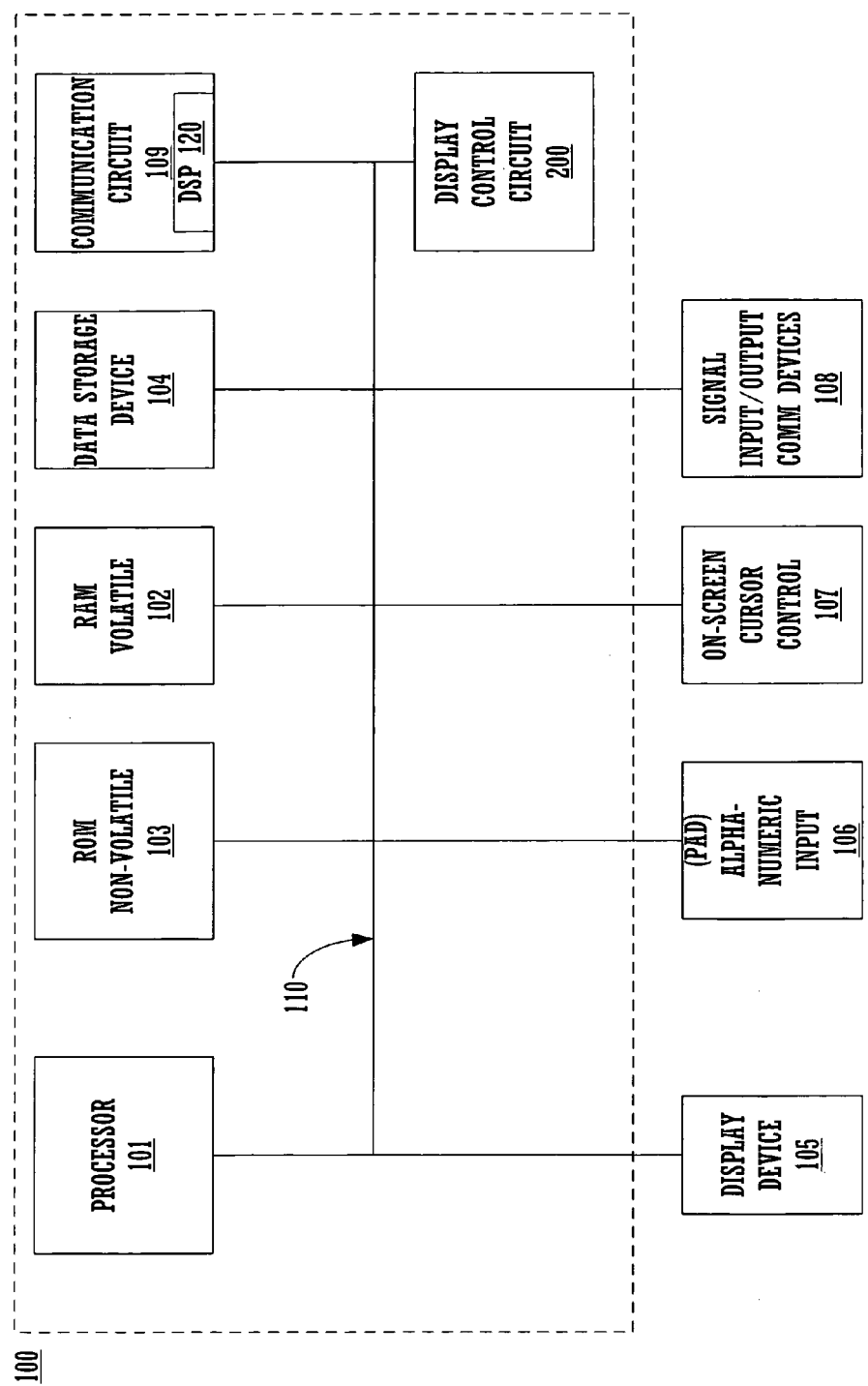
FIG. 9 is a block diagram of the palmtop computer system in FIG. 6, in accordance with one embodiment of the present invention.

FIG. 9 is a block diagram of the circuitry of the palmtop computer 100 in FIGS. 6A and 6B, in one embodiment of the present invention. The circuitry depicted is analogous to the described circuitry of FIG. 3D, with the following additions. Display control circuit 200 is added for activating the display panel, as previously described, and is shown as coupled to bus 110. Display device 105, shown as coupled to bus 110 in this embodiment of the present invention, is representative of flexible display panel 500 mounted to portable computer system 100 in FIG. 6A. In one embodiment of the present invention, on-screen cursor control 107, shown as coupled to bus 110, is flexible touch sensor 501, analogous to flexible touch sensor 501 of FIG. 6A.

Figure 10:
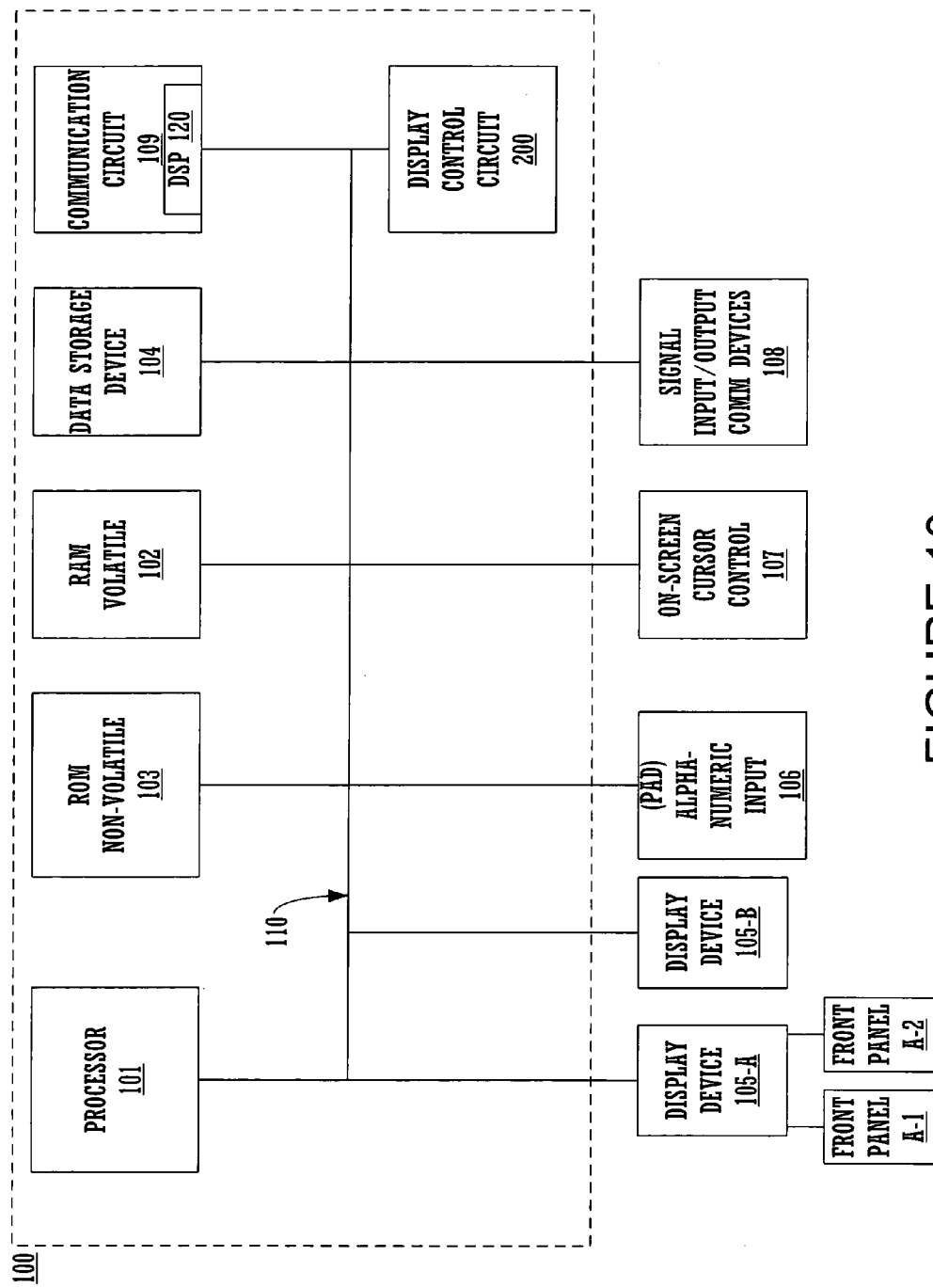
FIG. 10 is a block diagram of the palmtop computer system in FIGS. 7 and 8, in accordance with one embodiment of the present invention.

FIG. 10 is a block diagram of the circuitry of the palmtop computer 100 in FIGS. 7 and 8A, 8B, and 8C in one embodiment of the present invention. The circuitry depicted is analogous to the described circuitry of FIG. 3D, with the following additions. Display control circuit 200 is added for activating the appropriate display panel, as previously described, is shown as coupled to bus 110. Display device 105-A, with coupled front display panel A-1 and rear display panel A-2, shown as coupled to bus 110 in this embodiment of the present invention, is representative, respectively, of flexible display panel 500A and flexible display panel 500B disposed integral with front cover 300. Display device 105-B, shown as coupled to bus 110, is representative of the flexible display panel 600, coupled to palmtop computer 100, in one embodiment of the present invention. On-screen cursor control 107, shown as coupled to bus 110, in one embodiment of the present invention, is flexible touch sensor 501, analogous to flexible touch sensors 501A, 501B, and 600 of FIGS. 7 and 8A.

Figure 11:
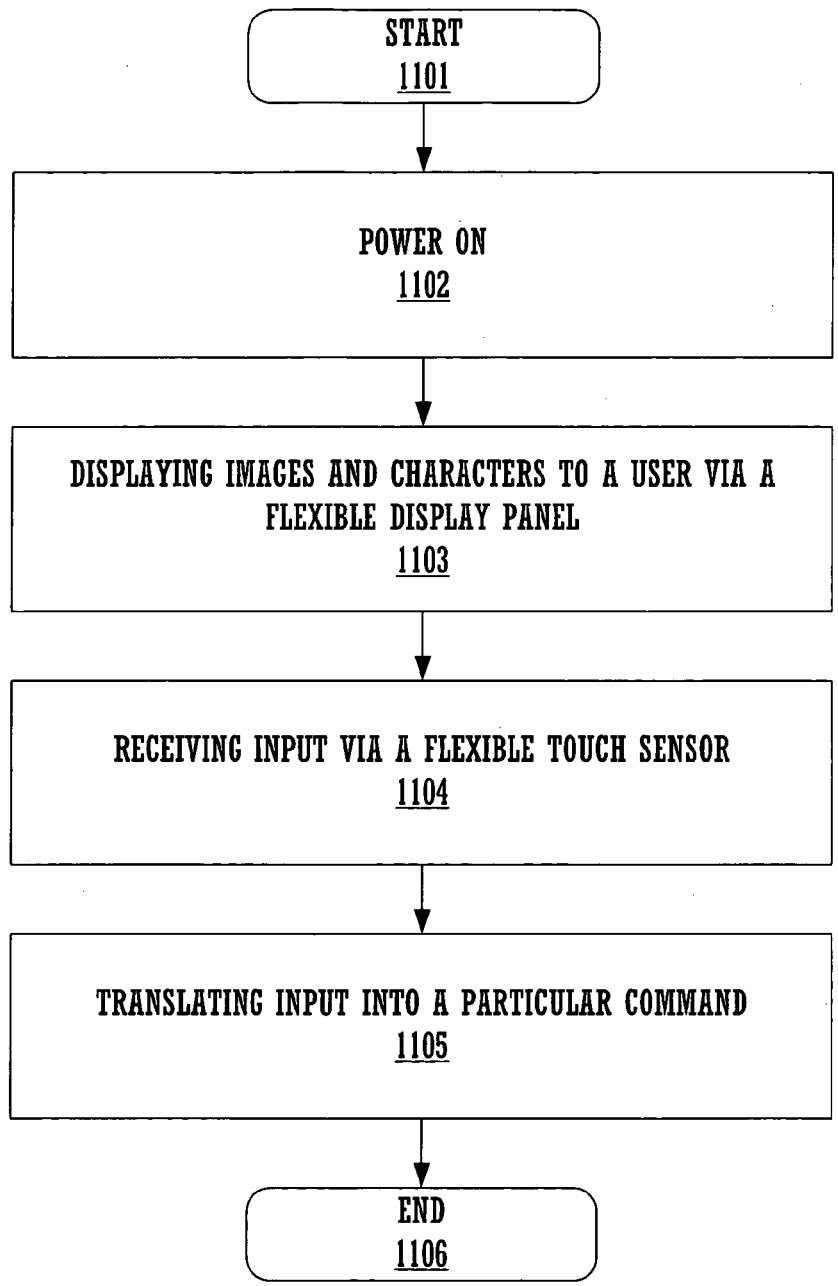
FIG. 11 is a flow chart showing the steps in a method 1100 for utilizing flexible touch sensors in a portable computer system configured with flexible display panels.

With reference to FIG. 11, a flow chart depicting the steps of a process 1100 utilizing the user interface for portable computer system 100, in accordance with one embodiment of the present invention.

In step 1102, a user turns on (powers up) portable computer 100 equipped with flexible display panel 500 and flexible touch sensor 501, in one embodiment of the present invention.

In step 1103, flexible display panel 500 displays images and characters to a user. In one example, the images and characters displayed via the flexible display panel take the form of a monthly calendar, e.g., the month of December 2000. This current example of one embodiment of the present invention is depicted in FIG. 6A.

In step 1104, the flexible display panel receives input from the user. In this example, the user touched the flexible display panel in the area that equates to Wednesday, December 20th. The flexible touch sensor is operable to register a position where contact is made with a surface of the flexible display panel. Therefore, in this example, the touching of the 20th of December, as the input, is then translated.

In step 1105, the flexible touch sensor translates the input, in this instance the contact with a surface of the flexible display panel equating to the 20th of December, into a particular command that controls the portable computer system. In this example of one embodiment of the present invention, the command instructs the portable computer system to display a new set of images and characters via the flexible display panel. In this example, the images and characters take the form of the daily planner for Wednesday, December 20th as is shown in FIG. 6B.

Therefore, by implementing the present invention as described and depicted, the disadvantages as previously discussed are overcome. By incorporating a flexible display panel with a flexible touch sensor, the overall height requirement of a portable electronic device is reduced. Further, by disposing the flexible display panel above the flexible touch sensor, the parallax effect is all but eliminated, while the quality of the display is not diminished.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A user interface for a portable electronic device, said user interface comprising:

a) a flexible display panel, said flexible display panel forming a first layer of said user interface; and
    b) a flexible touch sensor disposed immediately under a bottom of said flexible display panel and is separate from said flexible display panel, said flexible touch sensor forming a second layer of said user interface, wherein said flexible touch sensor is operable to register a position where contact is made with a surface of said user interface, wherein a particular position on said user interface is translated into a particular command controlling said portable electronic device wherein a support structure is disposed beneath said flexible touch sensor;
    an additional instance of said flexible touch sensor, said additional flexible touch sensor disposed beneath said support, said additional flexible touch sensor coupled to said user interface; and
    an additional instance of said flexible display panel, said additional flexible display coupled to said user interface, said additional flexible display panel disposed beneath said additional flexible touch sensor, whereby two sided flexible display functionality is provided to said user interface.

2. The user interface of claim 1 wherein said flexible touch sensor is disposed beneath said flexible display panel, wherein said flexible display panel is disposed between said flexible touch sensor and a user.

3. The user interface of claim 1 wherein said flexible touch sensor comprises a fabric, and wherein said fabric comprises conductive fibers, said conductive fibers adapted to conduct electrical impulses responsive to said contact with said user interface.

4. The user interface of claim 1 wherein the technology employed in the fabrication of said flexible display panel is electronic paper technology.

5. A portable electronic device comprising:
    a) a bus;
    b) a memory device coupled with said bus;
    c) a processor coupled with said bus;
    d) a flexible display panel coupled with said bus, said flexible display panel forming a first layer of a user interface; and
    e) a flexible touch sensor disposed immediately under a bottom of said flexible display panel and is separate from said flexible display panel, said flexible touch sensor forming a second layer of said user interface wherein a support structure is disposed beneath said flexible touch sensor, said support adapted to prevent puncturing of said flexible display panel and said flexible touch sensor;
    f) an additional instance of said flexible touch sensor, said additional flexible touch sensor disposed beneath said support, said additional flexible touch sensor coupled to said user interface; and
    g) an additional instance of said flexible display panel, said additional flexible display panel coupled to said portable electronic device, said additional flexible display panel disposed beneath said additional flexible touch sensor, whereby two sided flexible display functionality is provided to said portable electronic device.

6. The portable computer system electronic device of claim 5 wherein said flexible touch sensor is operable to register a position where contact is made with a surface of said flexible display panel, wherein a particular position on said flexible display panel is translated into a particular command for controlling said portable electronic device.

7. The portable electronic device of claim 5 wherein said flexible touch sensor is disposed beneath said flexible display panel, wherein said flexible display panel is disposed between said flexible touch sensor and a user.

8. The portable electronic device of claim 6 wherein said flexible touch sensor comprises a fabric, and wherein said fabric comprises conductive fibers, said conductive fibers adapted to conduct electrical impulses responsive to said contact of said flexible display panel.

9. The portable electronic device of claim 5 wherein the technology employed in the fabrication of said flexible display panel is electronic paper technology.

10. A method for providing a user interface for a portable electronic device, said method comprising the steps of:
    a) displaying images and characters to a user via a flexible display panel;
    b) receiving input via a flexible touch sensor disposed immediately under a bottom of said flexible display panel wherein a support structure is disposed beneath said flexible touch sensor and is separate from said flexible display panel, said flexible touch sensor operable to register a position where contact is made with a surface of said flexible display panel;
    c) receiving additional input via an additional flexible touch sensor, said additional flexible touch sensor disposed beneath said support, said additional flexible touch sensor coupled to said user interface; and
    d) displaying images and characters to a user via an additional instance of said flexible display panel, said additional flexible display disposed beneath said additional flexible touch sensor, whereby two sided flexible display functionality is provided to said user interface; and
    e) translating said input into a particular command for controlling said portable electronic device.

11. The method as recited in claim 10 wherein said flexible touch sensor is disposed beneath said flexible display panel, wherein said flexible display panel is disposed between said flexible touch sensor and a user.

12. The method as recited in claim 10 wherein said flexible touch sensor comprises a fabric, said fabric comprising conductive fibers adapted to conduct electrical impulses responsive to said contact with said user interface.

13. The method as recited in claim 10 wherein the technology employed in the fabrication of said flexible display panel is electronic paper technology.

\* \* \* \* \*